Figure 1:
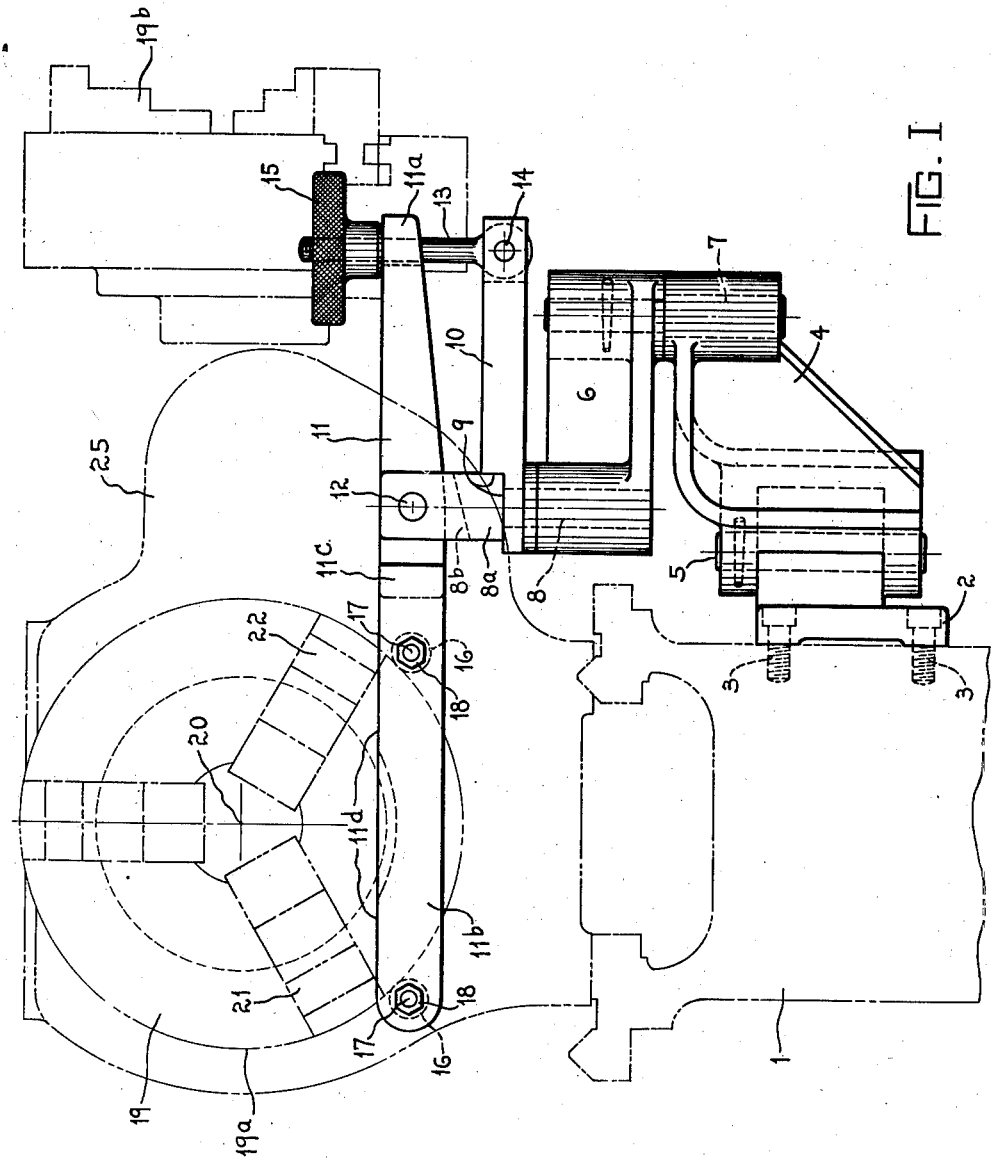

Feb. 13, 1945.   C. M. CARR   2,369,280
CHUCK HANDLING DEVICE
Filed Jan. 11, 1943   2 Sheets-Sheet 1

INVENTOR.
CHARLES M. CARR
BY Willard S. Greene
ATTORNEY.

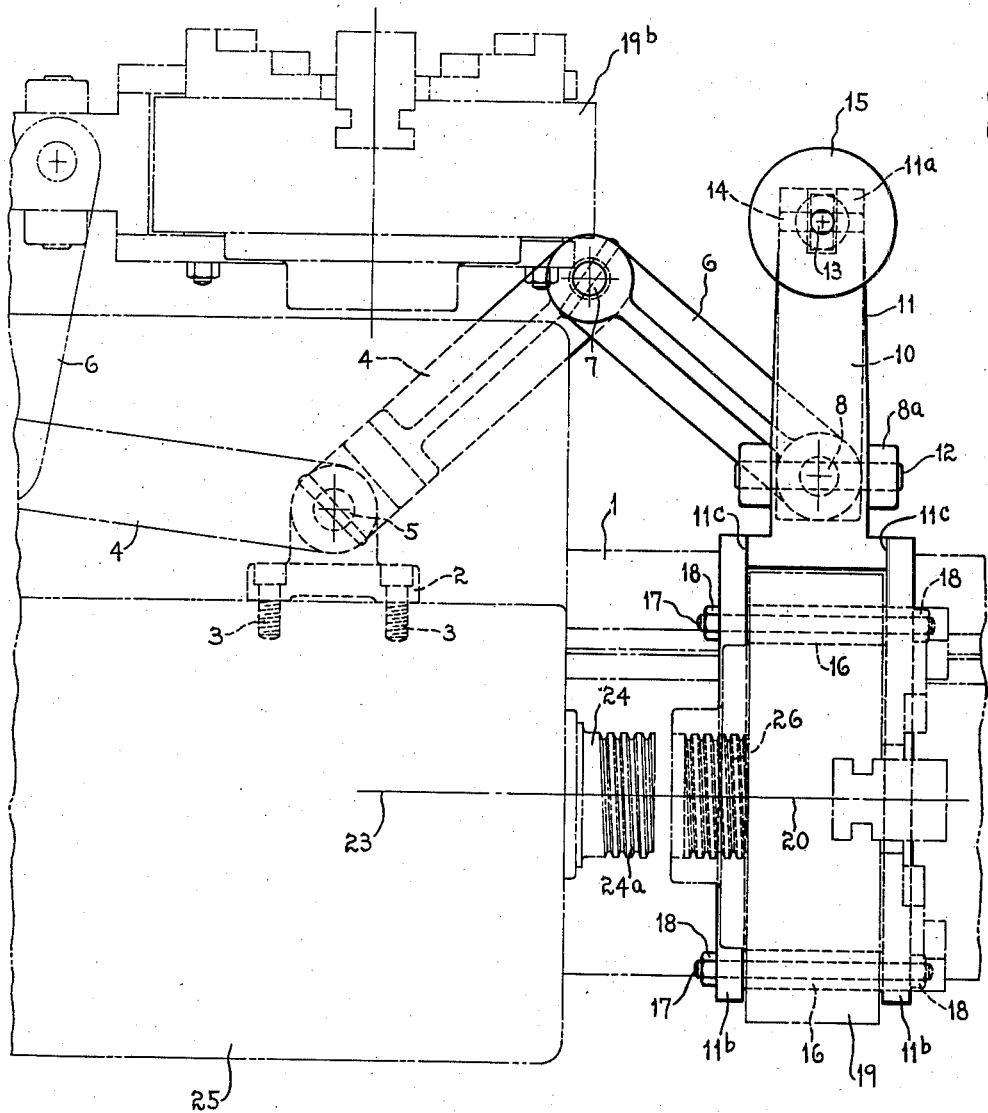
FIG. II

Patented Feb. 13, 1945

2,369,280

UNITED STATES PATENT OFFICE 2,369,280

CHUCK HANDLING DEVICE

Charles M. Carr, Cincinnati, Ohio, assignor to The R. K. Le Blond Machine Tool Company, Cincinnati, Ohio, a corporation of Delaware Application January 11, 1943, Serial No. 472,019

3 Claims. (Cl. 82—34)

This invention pertains to chuck handling mechanism and is particularly related to apparatus for manipulating the lathe chuck to and from operative position on the lathe work spindle. In the installation and removal of a chuck, such as the commonly used three or four jaw chuck for a lathe spindle, it has always been a difficult problem to properly align the chuck with the work spindle while screwing it on the threaded nose thereof. Also, difficulty has been experienced in removing the chuck from the work spindle in that the unsupported portion of the chuck as it is removed from the work spindle tends to bind on the threads and to destroy their accuracy. The chuck frequently under these conditions gets out of hand and falls off of the end of the spindle when unscrewed too far without great care and physical exertion exerted upon the part of the operator, resulting in the chuck dropping down on the bed ways and shears, damaging them and destroying their accuracy.

It is therefore with these former difficulties in mind that the present chuck handling device was devised so that the chuck would at no time have to be lifted by the operator in presenting it on the work spindle or removing it therefrom.

Another object was to provide an arrangement whereby the chuck could be readily moved to and from working position on the work spindle and quickly removed therefrom to a position out of the way with regard to other fixtures which it might be desired to mount on the work spindle.

It is also an object of this invention to provide a chuck handling device which may not only readily bring the chuck into operative position on the work spindle but which accurately aligns the chuck and holds it rigidly in exact aligned position with the work spindle so that it is merely necessary to rotate the work spindle by means of the power transmission of the headstock for screwing the threads of the spindle and chuck plate together for properly mounting it on the work spindle. Similarly reversing the work spindle of the headstock through its transmission the chuck may rapidly be withdrawn from the spindle while still held in accurate alignment and thus prevented from dropping down on the bed or requiring any physical exertion whatsoever on the part of the operator.

This device further contemplates an arrangement for gripping the chuck and at all times holding it in substantially operative position as it is swung to and from the spindle to a position in back of the lathe headstock to permit other types of work and fixtures to be mounted on the work spindle. It is understood with this arrangement that at no time is the chucking device lowered out of a horizontal plane. Its axis of rotation is at all times maintained in a horizontal plane passing through the axis of rotation of the work spindle and it is not necessary with this apparatus to place the chuck on the floor or lift it up again or to move it to any other type of holding device other than this complete mechanism carried by the lathe frame.

Further features and advantages of this invention will appear from the detailed description of the drawings in which: Figure I is a cross section through an engine lathe, particularly showing the novel chuck handling device mounted on the bed of the lathe for manipulating a conventional three jaw chuck for mounting or removal from the lathe headstock spindle.

Figure II is a fragmentary plan view of a portion of the lathe headstock of Figure I particularly showing the arrangement of the chuck handling device showing its position of presentation of the chuck to the work spindle and its inoperative position with the chuck moved to the back of the headstock out of the way of the working position of the lathe.

For exemplary purposes this invention is shown applied to a conventional engine lathe having a bed 1 to which is rigidly fixed the bracket 2 by appropriate screws 3. On this bracket 2 is pivotally mounted a supporting arm 4 by means of a hinge pin 5 and in turn on the bracket 4 is a second supporting arm 6 hinged to it by a pivotal connection through the medium of the pin 7. On the outer end of the supporting arm 6 is pivotally mounted a stud 8 having a squared upper portion 8a which rests down upon and is rigidly fixed to the surfaces 9 of the eye bolt supporting piece 10 so that the parts 8 and 10 are substantially an integral piece. The upper squared portion 8a of the stud 8 has a bifurcated portion 8b in which is mounted the chuck engaging member 11 on a suitable horizontally mounted pivot pin 12. The rear portion of the member 11 has a flattened end 11a in which may be swung an eye bolt 13 carried on the pivot pin 14 at the outer end of the member 10. A suitable thumb nut 15 is mounted on the eye bolt 13 and engages the top surface 11d of the member 11. Manipulating the thumb nut 15 effects rocking of the member 11 around its pivot 12 in a vertical plane.

The other end of the member 11 is provided with a pair of chuck supporting strips 11b which are appropriately welded or otherwise integrally fixed to the member 11 at the point 11c and are appropriately rigidly spaced apart by means of the spacer bushings 16 through which pass appropriate studs 17 clamped in place by nuts 18. The chuck 19 of the lathe is carried by its periphery 19a in engagement with the spacer bushings 16 as best seen in Figure I in such a way that its main axis of rotation 20 is in accurate horizontal alignment. The chuck jaws 21 and 22 are so positioned that they may be adjusted down to engage the top surface 11d of the supporting strips 11b so as to prevent the chuck from rotating when supported on the bushings 16.

It is therefore quite obvious that by adjusting the thumb nut 15 the axis 20 of the chuck 19 may be adjusted to the exact proper height to align itself with the work spindle axis 23 of the work spindle 24 in the headstock 25 and that the in-and-out adjustment in the horizontal plane and the exact alignment of the chuck axis 20 in other respects with the axis 23 of the work spindle 24 may be effected by appropriately manipulating the entire device through the medium of its pivot pins 5, 7, and 8.

In operation the chuck 19 is mounted in the device as shown in the drawings and the chuck moved toward the work spindle 24 whereupon the headstock transmission is operated to appropriately rotate the work spindle and thereby draw the chuck on its threaded portion 24a to bring the threaded portion 26 of the chuck 19 into full engagement with the work spindle of the lathe headstock 25. This engagement of the threaded portions 24a and 26 of the spindle and chuck respectively is accomplished while the chuck is held in exact alignment with the work spindle to thereby prevent any jamming or misalignment of the threads and to relieve all strain therefrom during the engagement of the chuck with the spindle. Similarly, by reversing the work spindle 24 of the lathe the chuck may be backed off and during the rotation of the work spindle 24 in either direction before engaging or disengaging the chuck from the work spindle the chuck is prevented from rotating by engagement of its jaws 21 and 22 with the surface 11d of the supporting member 11b for the chuck. Thus in this arrangement it is merely necessary for the operator to swing the chuck from the rear into position and operate the work spindle to attach or detach it from the threaded nose portion of the spindle.

When the chuck is not to be used it is swung back to the position 19b to the rear of the headstock where it may be readily positioned by swinging the entire device away from the working position as best seen in Figure II. Thus when not in use the chuck is not moved in any vertical direction at all but is always ready to be attached to the work spindle without any lifting before required upon the part of the operator.

After the chucking device 19 has been appropriately gripped on the work spindle the handling mechanism is detached from the chuck by first loosening the thumb nut 15 sufficiently to permit the eye bolt 13 to be swung clockwise to the right in Figure I, thus permitting the member 11 to have its end 11b dropped down to avoid the periphery of the chuck 19 and thus permit the entire device to be swung back away from working position on the lathe. To again re-engage the device with the chuck when removing the chuck from the work spindle the device is swung back to working position and the member 11b swung up beside the chuck and the eye bolt 13 again swung up into the slotted portion 11a of the member 11 and the thumb nut 15 tightened just sufficiently to carry the weight of the chuck with its axis in accurate alignment with the work spindle. The work spindle is then operated in the reverse direction and the chuck thereby automatically withdrawn from the work spindle and held on the device. It may then be swung back to the withdrawn position 19b.

Having thus fully set forth and described my invention what I claim as new and desire to secure by United States Letters Patent is:

1. In a chuck handling device for a lathe, a plurality of inter-connected pivotal supporting arms, mounted on said lathe, means for supporting a chuck, said means including a lever pivoted intermediate of its length to one of said arms and adapted to receive the chuck at one end of the lever, and means for adjustably moving the opposite end of the lever in order to cause the latter to swing into contact with the chuck whereby the supporting structure as a whole accommodates itself to any size of chuck and is adapted to swing the chuck away from the lathe.

2. In a chuck handling device for a lathe, a plurality of inter-connected pivotal supporting arms, mounted on said lathe, means for supporting a chuck, said means including a lever pivoted intermediate of its length to one of said arms and adapted to receive the chuck at one end of the lever, and means for adjustably moving the opposite end of the lever in order to cause the latter to swing into contact with the chuck whereby the supporting structure as a whole accommodates itself to any size of chuck and is adapted to swing the chuck away from the lathe, the contacting portion of said lever being adapted to span a pair of jaws on said chuck in order swingably and adjustably to support the chuck on the lathe.

3. In a chuck handling device for a lathe, a plurality of inter-connected pivotal supporting arms, mounted on said lathe, means for supporting a chuck, said means including a lever pivoted intermediate of its length to one of said arms and adapted to receive the chuck at one end of the lever, and means for adjustably moving the opposite end of the lever in order to cause the latter to swing into contact with the chuck whereby the supporting structure as a whole accommodates itself to any size of chuck and is adapted to swing the chuck away from the lathe, said lever comprising a pair of separated portions secured together by spacer elements at a distance comparable to the thickness of the chuck body and the spacer elements being positioned along said lever at a distance comparable to the distance between the outer edges of an adjacent pair of chuck jaws whereby the spaced portions of the lever can receive the chuck body but the jaws of the chuck rest on the spacer elements in order to prevent rotation of the chuck when the latter is supported by the lever.

CHARLES M. CARR.